UNITED STATES PATENT OFFICE.

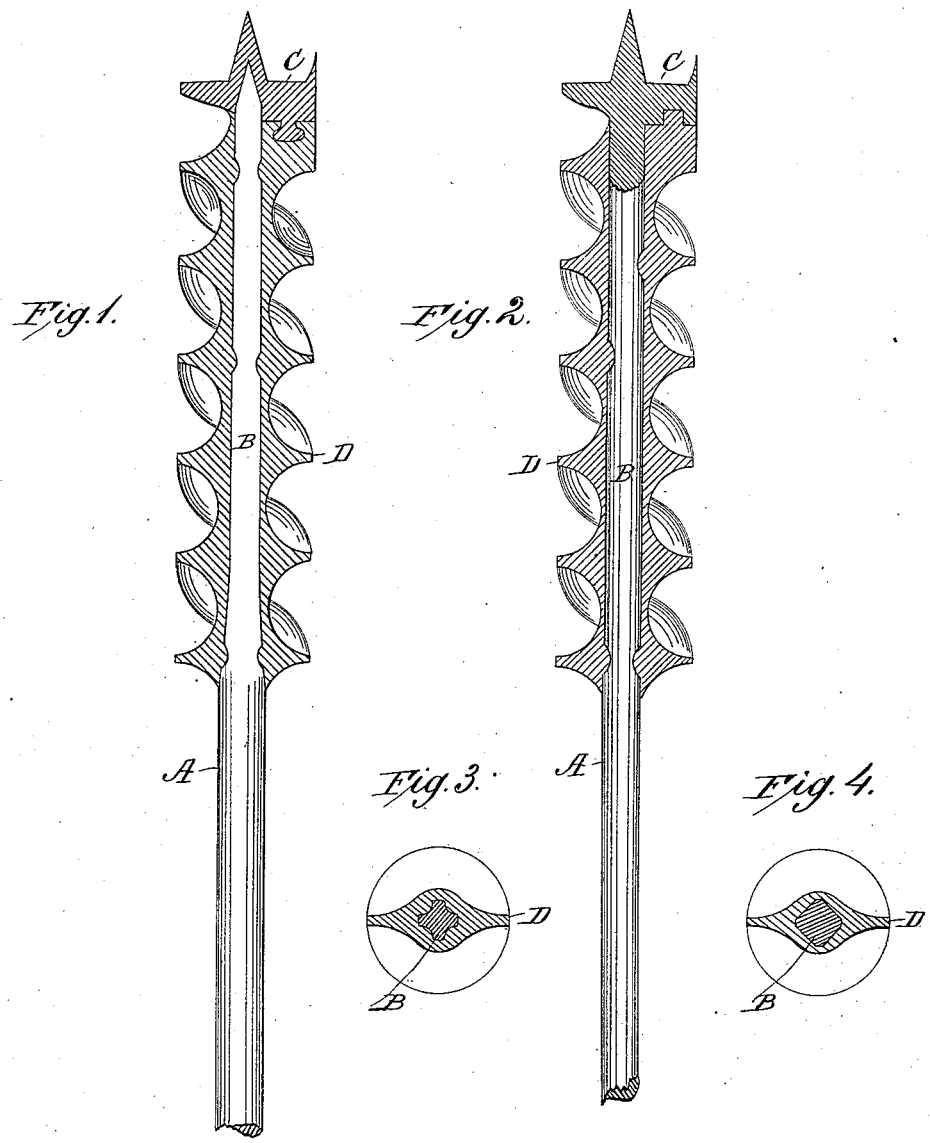

GEORGE F. STEARNS, OF CHESTER, ASSIGNOR OF ONE-HALF TO RICHARD J. ALLYN, OF HARTFORD, CONNECTICUT.

AUGER.

SPECIFICATION forming part of Letters Patent No. 333,170, dated December 29, 1885.

Application filed April 30, 1885. Serial No. 164,053. (No model.)

*To all whom it may concern:*

Be it known that I, GEORGE F. STEARNS, a citizen of the United States, residing at Chester, in the county of Middlesex and State of Connecticut, have invented certain new and useful Improvements in Augers, of which the following is a description.

This invention relates to that class of augers which are used for boring holes in wood, and in which the blade and the shank are made of separate parts joined together; and the object of the invention is to produce an auger having a steel blade, a wrought steel or iron shank extending to the blade, and a cast worm.

Heretofore augers have been made in which the worm and shank have been cast in one piece upon a blade or upon a blade having a short tang or shank projecting into the cast worm. In augers thus made the cast worm has to stand the whole strain of turning the blade in use, and it is likely to be broken both in use and by accidental dropping.

The object of this invention is to obviate the above objections and some others, and yet to gain the advantage of a cast worm to produce perfectly uniform work.

To this end my invention consists in the construction and combination of parts forming an auger hereinafter described and claimed, reference being had to the accompanying drawings, in which—

Figure 1 is a longitudinal section of an auger according to my invention. Fig. 2 is a longitudinal section of a modification of the same. Figs. 3 and 4 are transverse sections thereof through the worm and core.

A represents the shank of the auger, made of wrought iron or steel in any approved form.

B is an extension of the shank, forming the core, which is a principal characteristic of my invention. This core may be a portion of the blade C, as in Fig. 2, or it may enter into the latter as in Fig. 1, or it may be in any way attached thereto.

D represents the worm of the auger, which serves to carry out the boring-chips, and it may be either single or double. It is made by casting melted metal around the core and against the blade, to weld to both as perfectly as possible in the process of casting.

The subsequent finishing process may be any common method suitable for the purpose.

The core may be a square rod; or it may be in any way corrugated or roughened to cause the melted metal to adhere to it, so as to form a support for the latter throughout its length.

To give the melted metal and the blade a mechanical union, not wholly trusting to the weld to hold the cast metal to the other parts, the blade or the core may be provided with arms with heads like rivets, to anchor them in the cast metal; or the blade or shank may be perforated or in any other way roughened to cause the cast metal to adhere to them.

The blade may be either forged or cast steel, and the shank and the core, integral with the shank, may be of wrought steel or iron or of any substitute therefor.

In case the core and blade are in two separate pieces the cast worm may be trusted to unite the core and blade.

What I claim as my invention, and desire to secure by Letters Patent, is—

1. The combination of an auger-shank extended forward as a core, an auger blade or bit at the forward end of the core, and an auger-worm cast upon the said core and upon the rear face of the blade or bit, substantially as shown and described.

2. An auger having a shank and core in one piece, a bit at the forward end of the core, and a worm of cast metal welded or fused upon the core and to the bit, substantially as shown and described.

3. The combination of a boring-bit, a cast worm against its rear side, and a wrought shank extending through the worm to the bit, substantially as shown and described.

The above specification of my invention signed by me in the presence of two subscribing witnesses.

GEORGE F. STEARNS.

Witnesses:
W. X. STEVENS,
SOLON C. KEMON.